(12) United States Patent
Xu

(10) Patent No.: US 10,289,988 B1
(45) Date of Patent: May 14, 2019

(54) DELAYED, PURCHASE REQUEST-TRIGGERED ONLINE GAME PLATFORM REGISTRATION

(71) Applicant: Electronic Arts Inc., Redwood City, CA (US)

(72) Inventor: Ziqiang Xu, Belmont, CA (US)

(73) Assignee: Electronic Arts Inc., Redwood City, CA (US)

( * ) Notice: Subject to any disclaimer, the term of this patent is extended or adjusted under 35 U.S.C. 154(b) by 387 days.

(21) Appl. No.: 14/101,215

(22) Filed: Dec. 9, 2013

Related U.S. Application Data

(60) Provisional application No. 61/773,028, filed on Mar. 5, 2013.

(51) Int. Cl.
*G06Q 40/00* (2012.01)
*G06Q 20/12* (2012.01)
*G06Q 20/06* (2012.01)
*G06Q 30/02* (2012.01)

(52) U.S. Cl.
CPC ......... *G06Q 20/123* (2013.01); *G06Q 20/065* (2013.01); *G06Q 30/02* (2013.01); *G06Q 40/00* (2013.01)

(58) Field of Classification Search
CPC ........ A63F 13/12; A63F 13/795; A63F 13/87; G07F 17/32; G07F 17/3276; G06Q 40/00; G06Q 50/01; G06Q 30/02; G06Q 20/202
USPC .... 463/42, 25, 29, 40, 16; 705/14.17, 14.12, 705/40
See application file for complete search history.

(56) References Cited

U.S. PATENT DOCUMENTS

| 7,509,290 B1 | 3/2009 | McKee et al. |
| 8,663,004 B1 * | 3/2014 | Xu .......................... A63F 13/12 463/20 |
| 2001/0039210 A1 | 11/2001 | ST-Denis |
| 2003/0017873 A1 | 1/2003 | Ohara |
| 2003/0054878 A1 | 3/2003 | Benoy |
| 2003/0181242 A1 | 9/2003 | Lee |
| 2004/0106449 A1 | 6/2004 | Walker et al. .................. 463/25 |
| 2008/0194332 A1 * | 8/2008 | Kadikario ............... A63F 13/12 463/42 |
| 2008/0234043 A1 | 9/2008 | McCaskey et al. ............ 463/29 |

(Continued)

FOREIGN PATENT DOCUMENTS

KR     20110036315 A     4/2011

OTHER PUBLICATIONS

What is "Steam" and how does it work? AskUbuntu, Jan. 10, 2013, http://askubuntu.com/questions/239422/what-is-steam-and-how-does-it-work.

(Continued)

*Primary Examiner* — Kelly S Campen
(74) *Attorney, Agent, or Firm* — Knobbe, Martens, Olson & Bear, LLP

(57) ABSTRACT

A system and/or method for enabling a user to access a game without registering a platform account. In implementations, responsive to receiving an initial purchase request from an unregistered user, a platform registration request may be generated for the user to obtain stated information from the user for inclusion in a registered platform account, such that the user is requested to provide the stated information for inclusion in the registered platform account before a purchase associated with the initial purchase request is completed.

20 Claims, 4 Drawing Sheets

(56) References Cited

U.S. PATENT DOCUMENTS

| | | | |
|---|---|---|---|
| 2009/0215512 A1* | 8/2009 | Gannon | A63F 13/12 463/16 |
| 2009/0276351 A1* | 11/2009 | Faratin | G06Q 30/06 705/37 |
| 2010/0036720 A1* | 2/2010 | Jain | G06Q 30/02 705/14.13 |
| 2010/0056269 A1 | 3/2010 | Zalewski | |
| 2010/0107214 A1 | 4/2010 | Ganz | 726/1 |
| 2011/0258684 A1 | 10/2011 | Ganz | 726/4 |
| 2011/0270718 A1 | 11/2011 | Ganz | |
| 2012/0004041 A1 | 1/2012 | Pereira | |
| 2012/0265587 A1* | 10/2012 | Kinkead | G06Q 30/02 705/14.1 |
| 2013/0005481 A1 | 1/2013 | Tagawa | |
| 2013/0073388 A1* | 3/2013 | Heath | G06Q 50/01 705/14.53 |
| 2013/0084936 A1 | 4/2013 | Pease | |
| 2013/0097509 A1* | 4/2013 | Gomes | G06Q 40/02 715/723 |
| 2013/0102372 A1* | 4/2013 | Lutnick | G07F 17/3293 463/13 |
| 2013/0116038 A1* | 5/2013 | Alderucci | G06Q 20/207 463/25 |
| 2013/0117832 A1 | 5/2013 | Gandhi | |
| 2013/0337898 A1* | 12/2013 | Kelly | G07F 17/3239 463/25 |
| 2014/0075004 A1* | 3/2014 | Van Dusen | H04L 41/04 709/223 |
| 2014/0121007 A1 | 5/2014 | Santini | |
| 2014/0179434 A1* | 6/2014 | Xu | A63F 13/12 463/31 |

OTHER PUBLICATIONS

Wayback Machine of What is "Steam" and how does it work? Jan. 16, 2013, http://web.archive.org/web/20130116233739/http://askubuntu.com/questions/239422/what-is-steam-and-how-does-it-work.

* cited by examiner

DELAYED, PURCHASE REQUEST-TRIGGERED ONLINE GAME PLATFORM REGISTRATION

CROSS-REFERENCE TO RELATED APPLICATIONS

This application claims the benefit of U.S. Provisional Patent Application Ser. No. 61/773,028, entitled "Delayed, Purchase Request-Triggered Online Game Platform Registration", filed Mar. 5, 2013, which is hereby incorporated by reference into the present disclosure in its entirety.

FIELD OF THE DISCLOSURE

This disclosure relates to purchase-triggered platform account registration for online games, in which a platform registration request for a user is generated in response to a purchase request from an unregistered user.

BACKGROUND

Conventional online games are provided through gaming platforms, such as Facebook.com, Kabam.com, Zynga.com, Bigpoint Games, Steam, etc. Individual games that are accessed through a gaming platform may automatically create user accounts that are linked to an over-arching platform account for the users. For example, a platform account for a user may be linked to a host of individual game-level accounts for the user. By linking individual game user accounts to the over-arching platform account for a user, the user is able to log in to a gaming platform and access the individual games that are associated with the gaming platform.

However, conventional gaming platforms do not enable a user to access individual games until the user has initially registered a platform account for the user. This requirement creates a barrier to entry for new users to access an individual game. In practice, although an individual game may intrigue a user, the requirement that the user register for an account before being able to access the game may dissuade or discourage the user from accessing the game.

Accordingly, alternative approaches regarding accessing online games may lower the barrier for users to access a game, and may enable users to access games without first creating a platform account.

SUMMARY

One aspect of this disclosure relates to enabling user access to a game without the user first registering a platform account for an online gaming platform hosting game providers. In implementations, responsive to an initial purchase request from the user to initiate a purchase associated with an online game, a platform registration request for the user may be generated and transmitted to the user.

In implementations, a system may be configured to register a user for a platform account in response to a payment trigger. The system may include one or more physical processors and storage media. The storage media may store machine-readable instructions that cause the one or more physical processors to execute functions.

The machine-readable instructions may cause the one or more physical processors to facilitate access to an online game by an unregistered user, wherein the unregistered user is associated with a guest platform account on an online gaming platform through which the online game is accessed.

The machine-readable instructions may cause the one or more physical processors to receive and process purchase requests by the user for initiating purchases associated with the online game. The machine-readable instructions may cause the one or more physical processors to cause a platform registration request to be generated for the user, which obtains stated information from the user for inclusion in a registered platform account in response to receiving the purchase request. In implementations, it may be requested or desired for the user to provide the stated information before the initial purchase associated with the online game is completed.

In implementations, when the initial purchase associated with the online game is a purchase of platform-wide currency, usable across a plurality of different games associated with a game platform, the machine-readable instructions may comprise a game request module, a guest account module, a game access module, a platform purchase module and a platform account module.

The game request module may be configured to receive user requests for access to games and to determine whether users making the user requests are associated with registered platform accounts.

The guest account module may be configured to automatically create the guest platform account for the user responsive to reception of a user request from the user for access to the online game. The guest platform account may include a first identifier but may lack any stated information from the user.

The game access module may be configured to provide access for users to the games in response to receiving user requests for access to the games. In implementations, responsive to reception of the user request for access from the user, the game access module may effectuate transmission of a first platform request to a game provider of the online game. The first platform request may include the first identifier and effectuate provision of the first game to the user by the game provider. In implementations, responsive to reception of a user request for access to the online game from a registered user that is associated with a registered platform account, the game access module may effectuate transmission of a second platform request to the game provider of the online game, the second platform request may include a second identifier in the registered platform account and effectuate provision of the online game to the registered user by the game provider.

The platform purchase module may be configured to receive and process requests by users for initiating purchases of platform-wide currency, and be configured to determine when an unregistered user initiates a purchase of platform-wide currency.

In implementations, the platform account registration module may be further configured to receive stated information from the user in response to generating the registration request and to include the received stated information to transform the guest platform account into a registered platform account associated with the user. In implementations, the registration request may be presented to the user in a graphical user interface.

In implementations, the registered platform account associated with the user may retain the first identifier. Responsive to reception of a second request for access to the online game from the user, the game request module may be configured to effectuate transmission of another platform request to the game provider of the online game. The another platform request may include the first identifier in a registered platform account associated with the user and may effectuate provision of the online game to the user by the game provider.

In implementations, the stated information may comprise at least one of an email address and a password.

In implementations, where the initial purchase associated with the online game is associated with an in-game purchase usable only within the online game, the machine-readable instructions may comprise computer program modules including a platform request reception module, a game module, a communication module, an in-game purchase module, and a platform account registration initiation module.

The platform request reception module may be configured to receive platform requests to provide access for the users to the game. The platform requests may provide access for an unregistered user to the online game and may indicate that the unregistered user is not registered to a platform account.

The communication module may be configured to obtain action requests input by users, wherein the action requests specify execution of in-game actions by the user.

The in-game purchase module may be configured to receive and process requests by users for initiating purchases of in-game benefits, and configured to determine when an unregistered user initiates a purchase of in-game benefits.

The platform account registration initiation module may be configured to transmit instructions to a gaming platform in response to a determination that the unregistered user has initiated a purchase of in-game benefits. The instructions may effectuate presentation of a platform registration request to the unregistered user by the online gaming platform.

In implementations, the platform requests may include associated identifiers, and the game module may be configured to create a game account for the user associated with the first platform request's associated identifier.

In implementations, the in-game benefit is one or more of in-game currency, in-game items, in-game tips, and in-game cheats.

In implementations, the purchase request associated with the online game may be for in-game purchases usable only within the online game and platform-wide currency usable across a plurality of different games associated with a game platform.

In implementations, the initial purchase associated with the online game may be an in-game purchase, and the machine-readable instructions may further cause the one or more physical processors to facilitate access to an online game by a second unregistered user. The second unregistered user may be associated with a second guest platform account on the online gaming platform through which the online game is accessed. Responsive to an initial purchase request from the second user for initiating an initial purchase associated with the online game, a platform registration request may be generated for the second user to obtain stated information from the second user for inclusion in a second registered platform account. In implementations, the second user may be required to provide the stated information from the second user for inclusion in the second registered platform account before the second user's initial purchase associated with the online game is completed, and the second user's initial purchase may be a platform-wide currency.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

DETAILED DESCRIPTION

Figure 1:
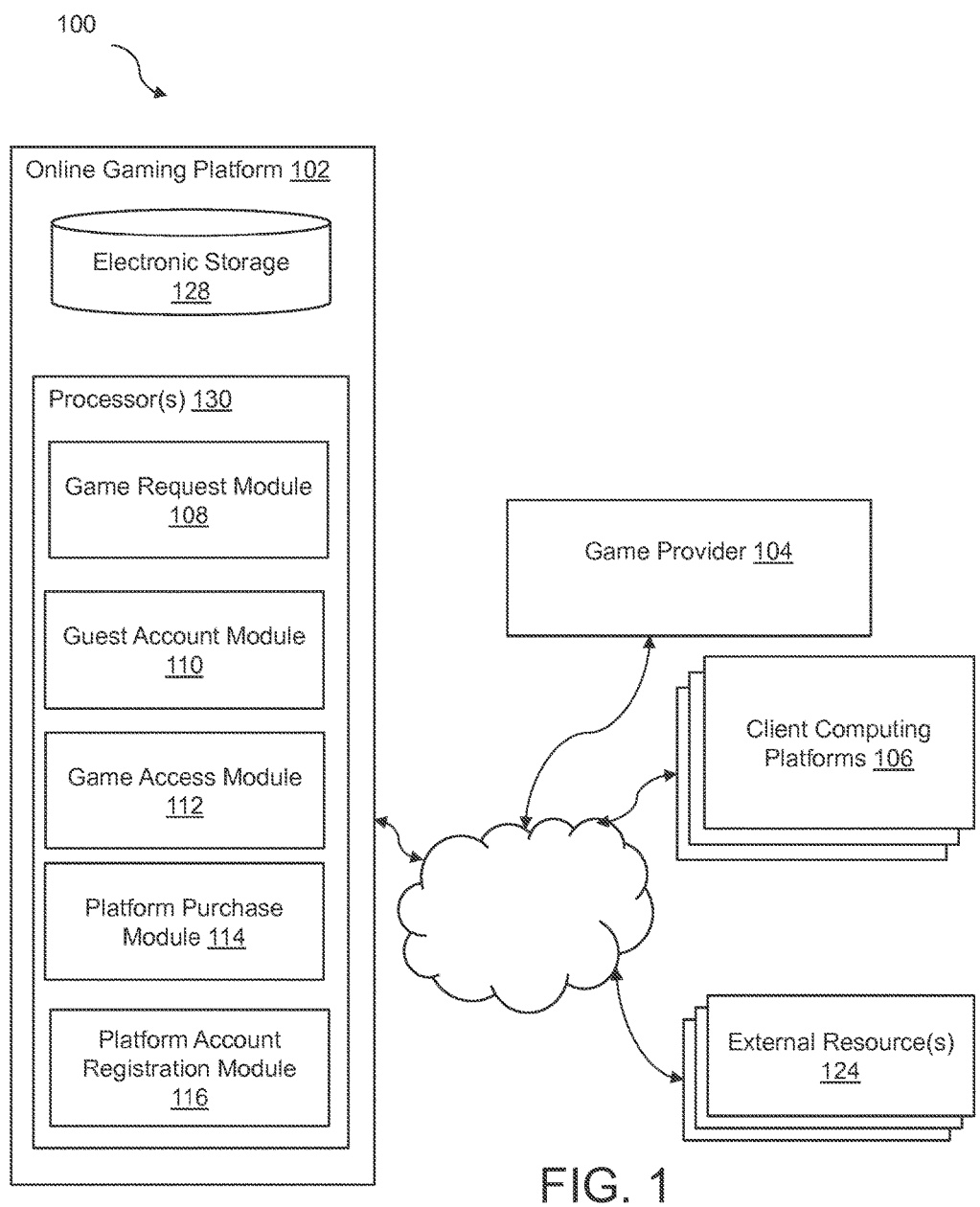
FIG. 1 illustrates a system configured to facilitate registering a platform account for a user responsive to an initial purchase request for platform-wide currency, in accordance with one or more implementations.

FIG. 1 illustrates a system 100 configured to register users on a virtual space. Providing the virtual space may include hosting the virtual space over a network. In some implementations, system 100 may include an online gaming platform 102, game provider 104, and one or more client computing platforms 106. The online gaming platform 102 and the game provider 104 may be configured to communicate with each other and/or with one or more client computing platforms 106 according to a client/server architecture. Users may access system 100, online gaming platform 102, game provider 104 and/or the virtual space via client computing platforms 106.

System 100 is only one example of a suitable computing environment and is not intended to suggest any limitation as to the scope of use or functionality of the features described herein. Providing the virtual space may include hosting the virtual space over a network. In this disclosure, system 100 may be configured for an online gaming platform 102 to facilitate access to an online game from a game provider 104 to an unregistered user. Responsive to an initial purchase request from a user to initiate purchases associated with the online game, a platform registration request may be generated for the user to obtain stated information from the user for inclusion in a registered platform account, such that the user is required to provide the stated information before the initial purchase associated with the online game is completed.

The online gaming platform 102 may be an online game platform configured to execute one or more computer program modules to host and provide access to games from game provider 104. The computer modules may include one or more of a game request module 108, a guest account module 110, a game access module 112, a platform purchase module, 114, and a platform account registration module 116.

The game request module 108 may be configured to receive user requests from client computing platforms 106 for access to games hosted by online gaming platform 102 to effectuate provision of a game to the user. In response to receiving a user request for access to a game, game request module 108 may determine whether a user associated with the user request has a registered account or does not have a registered account for gaming platform 102. In implementations, if the user request does not include any stated information from the user, gaming request module 108 may determine that the user does not have a registered account for online gaming platform 102. If the user request includes stated information, such as an email address and password, that matches stated information for a registered user, gaming request module 108 may determine that the user does have a registered account for online gaming platform 102. Responsive to reception of a request for access to the game for the registered user, the game request module 108 may effectuate transmission of a platform request to game provider 104 for access to the game. The platform request may include an identifier within the registered platform account associated with the registered user and effectuate provision of the online game to the user by game provider 104.

The guest account module 110 may be configured to automatically create a guest platform account for the user if the user is not associated with a registered platform account. In embodiments, guest account module 110 may create the guest platform for the user in response to receipt of a user request from client computing platform 106 for a user that does not have a registered platform account. The guest platform account may be created to provide the user access to games provided by game provider(s) 104 hosted by online gaming platform 102. In implementations, the created guest platform account may include an identifier to associate the guest platform account with the user and may lack stated information received from the user. The guest account module 110 may be also configured to access and/or manage one or more guest platform accounts and registered platform accounts associated with users of the system 100. The one or more guest accounts and registered platform accounts may include information stored by online gaming platform 102, one or more of the client computing platforms 106, and/or other storage locations. The registered platform account may include, for example, stated information identifying users (e.g., an email address or handle, a number, an identifier, and/or other identifying information) within the virtual space, security login information (e.g., a login code or password), an identifier associated with the user, virtual space account information, subscription information, location information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users (e.g., credit card information), browsing history of users, a client computing platform identification associated with a user, a phone number associated with a user, and/or other information related to users.

The game access module 112 may be configured to provide access for users to a game provided by game provider 104. The game access module 112 may provide access to the game in response to receiving the user request from client computing platform 106 indicating that a user desires access to the game. In embodiments, the game access module 112 may be configured to effectuate transmission of a first platform request to the game provider 104 of the game in response to receiving the user request from a user without a registered platform account. The platform request may include the identifier associated with the user. The game access module 112 may also be configured to effectuate transmission of a second platform request to the game provider 104 of the game in response to receiving a user request for access to the game from a user with a registered platform account. In implementations, the second platform request may include an identifier associated with the registered platform account. Responsive to receiving the second platform request, the game access module 112 may effectuate provision of the game to the second user by game provider 104.

The platform purchase module 114 may be configured to receive and process requests by users for initiating purchases of platform-wide currency. Platform-wide currency may be usable across a plurality of different games associated with gaming platform 102. In response to receiving a purchase request, platform purchase module 114 may be configured to determine if the purchase request is associated with a registered or unregistered user. In implementations, if the purchase request does not include any stated information from the user, platform purchase module 114 may determine that the user associated with the purchase request does not have a registered account for online gaming platform 102. Responsive to an initial purchase request from the unregistered user for initiating an initial purchase for platform-wide currency associated with the online game, the platform purchase module 114 may be configured to cause a platform registration request to be generated by platform account registration module 116 to obtain stated information from the user. In implementations, it may be required that the user provide stated information for inclusion in the registered platform account before the initial purchase associated with the online game is completed.

The platform account registration module 116 may be configured to generate and/or transmit a platform registration request for a user in response to a determination that the user has initiated a purchase of platform-wide currency. The platform registration request may be an interface configured to be displayed on client computing device 106, such as a pop-up. The interface may include fields where the user may enter stated information identifying the user (e.g., an email address or handle, a number, an identifier, and/or other identifying information) within the gaming platform 102, security login information (e.g., a login code or password), subscription information, relationship information (e.g., information related to relationships between users in the virtual space), location information, demographic information associated with the user, information stated by the user, purchase information of the user such as a credit card number that may be used for purchases within system 100, a phone number associated with a user, and/or other information related to the user. In response to transmitting the registration request with the interface to the user, the platform account registration module 116 may be configured to receive stated information associated with the user. Responsive to receiving the stated information associated with the user, the guest platform account for the user may be transformed into a registered platform account. The transformed registered platform account may include the stated information for the user, purchase information such as a credit card associated with the user, the identifier associated with the user, and any other information stored within the guest platform account associated with the user.

In some implementations, the online gaming platform 102, game provider 104, client computing platforms 106, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 106, and/or external resources 124 may be operatively linked via some other communication media.

Game provider 104 may be configured to provide a game within virtual space to users. Games provided by game provider 104 may be hosted by online gaming platform 102. It should be appreciated that although game provider 104 and online gaming platform 102 are illustrated in FIG. 1 as being implemented within different entities, online gaming platform 102 may provide the functionality of game provider 104. Game provider 104 may be a game provider that is the same as or similar to game provider 204 in FIG. 2, discussed in detail below, in accordance with one or more implementations.

A given client computing platform 106 may include one or more processors configured to execute computer program modules. The computer program modules may be configured to enable an expert or user associated with the given client computing platform 106 to interface with system 100 and/or external resources 124, and/or provide other functionality attributed herein to client computing platforms 106. By way of non-limiting example, the given client computing platform 106 may include one or more of a desktop computer, a laptop computer, a handheld computer, a tablet computing platform, a NetBook, a Smartphone, a gaming console, and/or other computing platforms.

External resources 124 may include sources of information, hosts and/or providers of virtual environments outside of system 100, external entities participating with system 100, and/or other resources. In some implementations, some or all of the functionality attributed herein to external resources 124 may be provided by resources included in system 100.

Online gaming platform 102 may include electronic storage 128, one or more processors 130, and/or other components. Online gaming platform 102 may include communication lines and/or ports to enable the exchange of information with a network and/or other computing platforms. Illustration of online gaming platform 102 in FIG. 1 is not intended to be limiting. Online gaming platform 102 may include a plurality of hardware, software, and/or firmware components operating together to provide the functionality attributed herein to online gaming platform 102. For example, online gaming platform 102 may be implemented by a cloud of computing platforms operating together as online gaming platform 102.

Electronic storage 128 may comprise non-transitory storage media that electronically stores information. The electronic storage media of electronic storage 128 may include one or both of system storage that is provided integrally (i.e., substantially non-removable) with online gaming platform 102 and/or removable storage that is removably connectable to online gaming platform 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor 130, information received from online gaming platform 102, information received from client computing platforms 106, and/or other information that enables online gaming platform 102 to function as described herein.

Processor(s) 130 is configured to provide information processing capabilities in online gaming platform 102. As such, processor 130 may include one or more of a digital processor, an analog processor, a digital circuit designed to process information, an analog circuit designed to process information, a state machine, and/or other mechanisms for electronically processing information. Although processor 130 is shown in FIG. 1 as a single entity, this is for illustrative purposes only. In some implementations, processor 130 may include a plurality of processing units. These processing units may be physically located within the same device, or processor 130 may represent processing functionality of a plurality of devices operating in coordination. The processor 130 may be configured to execute modules 108, 110, 112, 114, and 116. Processor 130 may be configured to execute modules 108, 110, 112, 114, and 116 by software; hardware; firmware; some combination of software, hardware, and/or firmware; and/or other mechanisms for configuring processing capabilities on processor 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and 116 are illustrated in FIG. 1 as being implemented within a single processing unit, in implementations in which processor 130 includes multiple processing units, one or more of modules 108, 110, 112, 114, and 116 may be implemented remotely from the other modules. The description of the functionality provided by the different modules 108, 110, 112, 114, and 116 described below is for illustrative purposes, and is not intended to be limiting, as any of modules 108, 110, 112, 114, and 116 may provide more or less functionality than is described. For example, one or more of modules 108, 110, 112, 114, and 116 may be eliminated, and some or all of its functionality may be provided by other ones of modules 108, 110, 112, 114, and 116. As another example, processor 130 may be configured to execute one or more additional modules that may perform some or all of the functionality attributed below to one of modules 108, 110, 112, 114, and 116.

Figure 2:
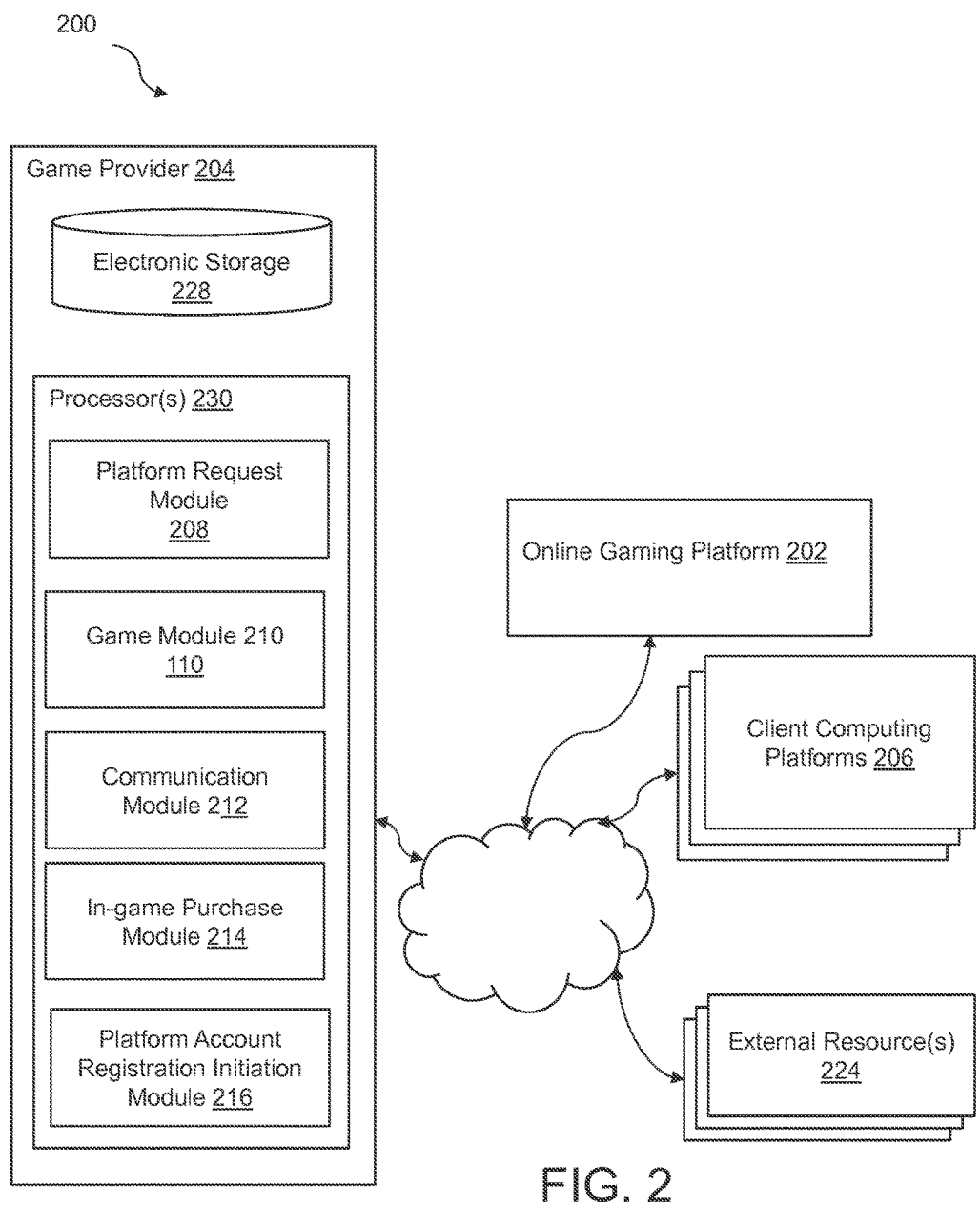
FIG. 2 illustrates a system configured to facilitate registering a platform account for a user responsive to an initial purchase request for in-game benefits, in accordance with one or more implementations.

FIG. 2 illustrates a system 200 configured to register users on a virtual space. Providing the virtual space may include hosting the virtual space over a network. In some implementations, system 200 may include an online gaming platform 202, game provider 204, and one or more client computing platforms 206. The online gaming platform 202 and the game provider 204 may be configured to communicate with each other and/or with one or more client computing platforms 206 according to a client/server architecture. Users may access system 200, online gaming platform 202, game provider 204 and/or the virtual space via client computing platforms 206.

System 200 is only one example of a suitable computing environment and is not intended to suggest any limitation as to the scope of use or functionality of the features described herein. Providing the virtual space may include hosting the virtual space over a network. In this disclosure, system 200 may be configured for an online gaming platform 202 to facilitate access to an online game from a game provider 204 to an unregistered user. Responsive to an initial purchase request from a user to initiate purchases associated with the online game, a platform registration request may be generated for the user to obtain stated information from the user for inclusion in a registered platform account, such that the user is required to provide the stated information before the initial purchase associated with the online game is completed.

The game provider 204 may be an online game provider configured to execute one or more computer program modules. In implementations, game provider 204 may be configured to receive user requests to provide access to online games to users from the game provider 204. The computer program modules may include one or more of a platform request reception module 208, a game module 210, a communication module 212, an in-game purchase module 214, and a platform account registration initiation module 216. As noted, the client computing platform(s) 206 or gaming platform 202 may include one or more computer program modules that are the same as or similar to the computer program modules of the game provider 204 to facilitate registering a user to a gaming platform.

The platform request reception module 208 may be configured to receive platform requests to provide users with access to an online game associated with game provider 204. The received platform requests may include a request to provide access to an online game hosted by game provider 204. In implementations, the received platform request may include data indicating whether the user is registered to a platform account or is not registered to an associated platform account. The platform account may be associated with online gaming platform 202 hosting a plurality of games from a plurality of game providers 204. A user registered to a platform account for the online gaming platform 202 may utilize the platform account to access games provided by game provider 204. A user not registered to a platform account may still access the games provided by game provider 204 via a guest platform account. A registered platform account may include stated information from the user and a platform identifier, and a guest platform account may include a platform identifier for the user but may lack any stated information received from the user. In implementations, the platform identifier within the guest account may be the same identifier within a game account for the user created by game provider 204. If the user enters stated information to create the registered platform account, the identifier associated with the guest account may be included in the registered platform account for the user.

The game module 210 may be configured to execute an instance of the game. In response to receiving the platform request for the game, game module 210 may implement the instance of the game to provide access to the game to the user and may also create a game account for the user. The game account may include the platform identifier within the guest account for the user that is not registered to a platform account. In implementations, game provider 204 may include a plurality of game modules 210, where each game module is associated with a different game. In response to receiving action requests for in-game actions input by users, game module 210 may be configured to implement the in-game actions in the instance of the game.

Game module 210 may be configured to implement the instance of the game in virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from game module 210. Expressions of the instance executed on the clients may include space logic that effectively provides for execution of a limited version of the instance on a client that is synchronized and/or verified with state information received from game module 210. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 206) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by game module 210 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by game module 210, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The communications module 212 may be configured to obtain action requests input by users. The action requests may specify execution of in-game actions to be performed by game module 110. The in-game actions may be associated with moving or controlling a user controlled element, changing a view of the virtual space, initiating a purchase request, or any other action interacting with the virtual space, such as managing an inventory of virtual goods or currency, The in-game purchase module 214 may be configured to receive and process requests by users for initiating purchases of in-game benefits. In-game benefits may be usable only within the online game provided by the game provider 204, and may be associated with one or more of in-game currency, in-game items, in-game tips, and in-game cheats. In-game purchase module 214 may also be configured to determine when an unregistered user initiates a purchase of in-game benefits. Responsive to an initial purchase request from an unregistered user, in-game purchase module 214 may be configured to cause a platform registration request to be generated to obtain stated information from the unregistered user. The stated information may be included in a registered platform account for the user, and the user may be required to provide the stated information for inclusion in the registered platform account before the initial purchase associated with the online game is completed.

The platform account registration initiation module 216 may be configured to transmit instructions to online gaming platform 202 in response to a determination that the unregistered user has initiated a purchase of in-game benefits. The instructions may effectuate presentation of a platform registration request in a graphical user interface to the user by online gaming platform 202. The platform registration request may include fields where the user may enter stated information, such as a username and/or password, for the user and information associated with the purchase. In implementations, in response to the presentation of the platform registration request to the user, platform account registration initiation module 216 may be configured to receive from the gaming platform 202 an indication as to whether stated information was received from the user. In implementations, it may be requested for the user to enter stated information associated with the platform registration request before completing the purchase associated with the in-game benefit is completed. Responsive to the user providing the stated information, the guest platform account for the user may be transformed into a registered platform account. The transformed registered platform account may include the stated information for the user, purchase information such as a credit card associated with the user, the identifier associated with the user, and any other information stored within the guest platform account associated with the user.

The gaming platform 202 may be a server configured to host a plurality of games from game provider(s) 204. In implementations, gaming platform 202 may be configured to register users to platform accounts which may be used to access the games from game provider 204 hosted by gaming platform 202 and to execute one or more computer program modules. The gaming platform 202 may be a gaming platform that is the same as or similar to online gaming platform 102, in accordance with one or more implementations.

A given client computing platform 206 may include one or more processors configured to execute computer program modules. The computer program modules may be configured to enable an expert or user associated with the given client computing platform 206 to interface with system 200 and/or external resources 224, and/or provide other functionality attributed herein to client computing platforms 206.

External resources 224 may include sources of information, hosts and/or providers of virtual environments outside of system 200, external entities participating with system 200, and/or other resources. In some implementations, some or all of the functionality attributed herein to external resources 224 may be provided by resources included in system 200.

Game provider 204 may include electronic storage 228, one or more processors 230, and/or other components. Game provider 204 may include communication lines, or ports to enable the exchange of information with a network and/or other computing platforms. Illustration of game provider 204 in FIG. 2 is not intended to be limiting. Game provider 204 may include a plurality of hardware, software, and/or firmware components operating together to provide the functionality attributed herein to game provider 204. For example, game provider 204 may be implemented by a cloud of computing platforms operating together as game provider 204.

Electronic storage 228 may comprise non-transitory storage media that electronically stores information. Processor(s) 230 may be configured to provide information processing capabilities in game provider 204. As such, processor 230 may include one or more of a digital processor, an analog processor, a digital circuit designed to process information, an analog circuit designed to process information, a state machine, and/or other mechanisms for electronically processing information. Although processor 230 is shown in FIG. 2 as a single entity, this is for illustrative purposes only.

In some implementations, processor 230 may include a plurality of processing units. These processing units may be physically located within the same device, or processor 230 may represent processing functionality of a plurality of devices operating in coordination. The processor 130 may be configured to execute modules 208, 210, 212, 214, and 216. Processor 230 may be configured to execute modules 208, 210, 212, 214, and 216 by software; hardware; firmware; some combination of software, hardware, and/or firmware; and/or other mechanisms for configuring processing capabilities on processor 230. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, and 216 are illustrated in FIG. 2 as being implemented within a single processing unit, in implementations in which processor 230 includes multiple processing units, one or more of modules 208, 210, 212, 214, and 216 may be implemented remotely from the other modules. The description of the functionality provided by the different modules 208, 210, 212, 214, and 216 described below is for illustrative purposes, and is not intended to be limiting, as any of modules 208, 210, 212, 214, and 216 may provide more or less functionality than is described. For example, one or more of modules 208, 210, 212, 214, and 216 may be eliminated, and some or all of its functionality may be provided by other ones of modules 208, 210, 212, 214, and 216. As another example, processor 230 may be configured to execute one or more additional modules that may perform some or all of the functionality attributed below to one of modules 208, 210, 212, 214, and 216.

Figure 3:
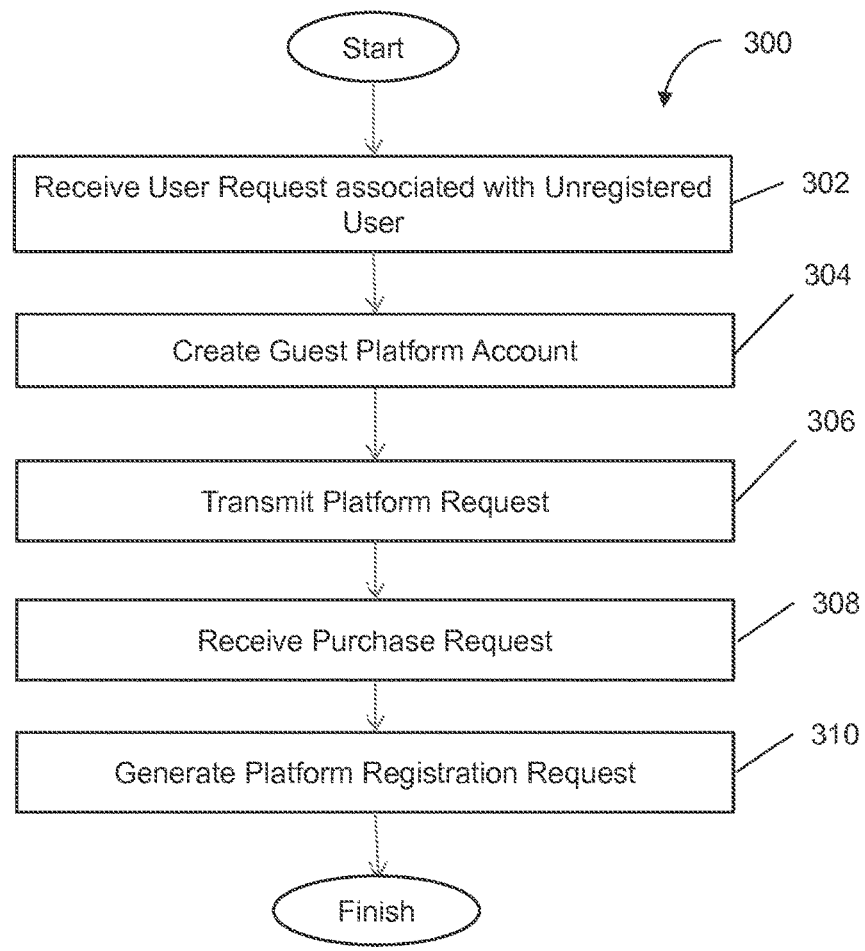
FIG. 3 illustrates a method of registering a platform account for a user responsive to an initial purchase request for platform-wide currency, in accordance with one or more implementations.

FIG. 3 illustrates a method for in-game, payment-triggered game platform registration. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a user request for access to games hosted by a gaming platform from a user that is not associated with a registered platform account may be received. The user request may include an identifier associated with a game of the plurality of games that a user desires access to. Operation 302 may be performed by a game request module that is the same as or similar to game request module 108, in accordance with one or more implementations.

At an operation 304, responsive to a determination that the user associated with the user request is not registered to a platform account, a guest platform account may be automatically created for the user. In implementations, the created guest platform account may include an identifier for the user but may lack stated information received from the user. The identifier may be retained when and if the guest platform account is transformed into a registered platform account. Operation 304 may be performed by a game request module that is the same as or similar to guest account module 110, in accordance with one or more implementations.

At an operation 306, a platform request may be transmitted to a game provider of the online game to effectuate provision of the online game to the user. The platform request may include the identifier within the guest account. Operation 306 may be performed by a game access module that is the same as or similar to game access module 112, in accordance with one or more implementations.

At an operation 308, a purchase request by the unregistered user may be received and processed to initiate a purchase associated with the online game. In implementations, the received purchase request may be associated with a platform-wide currency that is usable across a plurality of different games and gaming providers associated with an online gaming platform. Operation 308 may be performed by a platform purchase module that is the same as or similar to platform purchase module 114, in accordance with one or more implementations.

At an operation 310, a platform registration request may be generated for the unregistered user in response to receiving the purchase request associated with platform-wide currency. The platform registration request may be configured to obtain stated information from the user before the purchase associated with the purchase request is completed. The platform registration request may be presented to the user as an interface with fields where the user may enter stated information, such as a username and password, and purchase information to complete the purchase, such as credit card information. In response to transmitting the platform registration request to the user, the user may enter stated information and purchase information within the fields on the interface, and the stated information and purchase information associated with the user may be received. Responsive to receiving the stated information and the purchase information, the guest platform account for the user may be transformed into a registered platform account for the user. The registered platform account may include the stated information and the purchase information for the user, the identifier for the user within the guest account, and/or any other information stored within the guest platform account. Operation 308 may be performed by a platform account registration module that is the same as or similar to platform account registration module 116, in accordance with one or more implementations.

Figure 4:
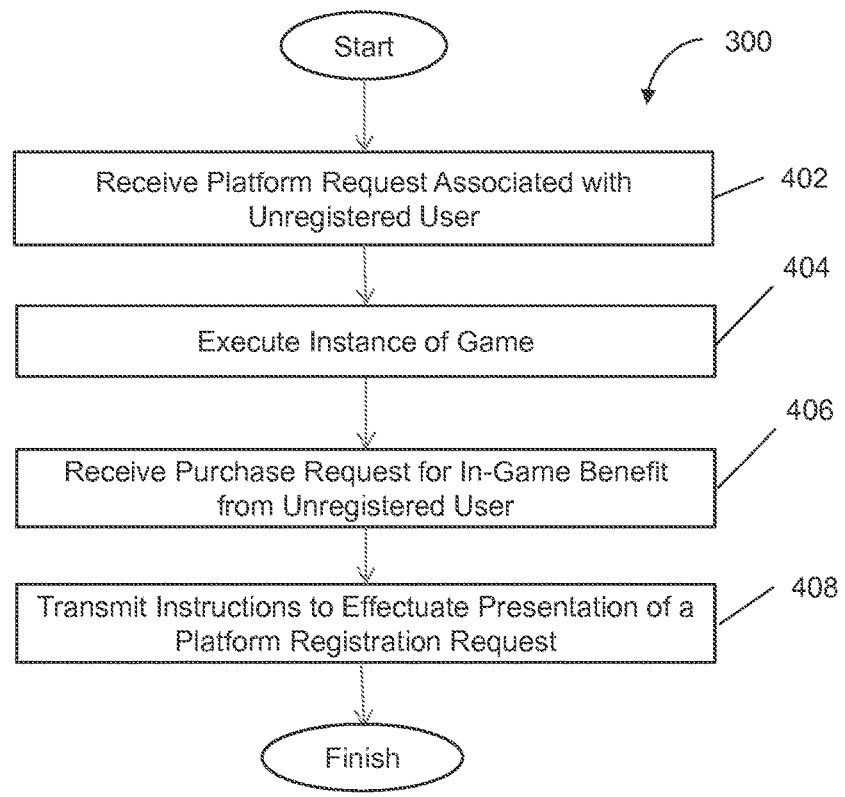
FIG. 4 illustrates a method of registering a platform account for a user responsive to an initial purchase request for in-game currency, in accordance with one or more implementations.

FIG. 4 illustrates a method for in-game, payment-triggered game platform registration. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At step 402, a platform request to provide access for an unregistered user to an online game may be received. The platform request may include data indicating that the user is notregistered to a platform account for a platform provider hosting the game by the game provider and may include an identifier associated with a guest platform account for the user. Operation 402 may be performed by a platform request reception module that is the same as or similar to platform request reception module 208, in accordance with one or more implementations.

At an operation 404, an instance of the game may be executed to provide access to the game for the user in response to receiving the platform request. Responsive to providing the user access to the game, the user may input action requests to specify executions of in-game actions. The in-game actions may then be implemented in the instance of the game. Operation 404 may be performed by a game module that is the same as or similar to game module 210, in accordance with one or more implementations.

At an operation 406, a purchase request by the unregistered user may be received and processed to initiate a purchase associated with the online game. In implementations, the received purchase request may be associated with in-game benefits that are usable only within the online game. Operation 406 may be performed by an in-game purchase module that is the same as or similar to in-game purchase module 214, in accordance with one or more implementations.

At an operation 408, instructions may be transmitted to an online gaming platform in response to a determination that the unregistered user has initiated a purchase of in-game benefits. The instructions may effectuate presentation of a platform registration request to the user by the online gaming platform. The platform registration request may be configured to obtain stated information from the user before the purchase associated with the purchase request is completed. The platform registration request may be presented to the user as an interface with fields where the user may enter stated information, such as a username and password and purchase information to complete the purchase, such as credit card information. In response to transmitting the platform registration request to the user, the user may enter stated information and purchase information within the fields on the interface, and the stated information and purchase information associated with the user may be received to create a registered platform account for the user. The registered platform account for the user may be utilized to provide the user access to the games from game providers hosted by the gaming platform. Operation 408 may be performed by a platform account registration module that is the same as or similar to platform account registration module 216, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for in-game, payment-triggered game platform registration, the system comprising:
one or more physical processors; and
storage media storing machine-readable instructions that cause the one or more physical processors to:
receive a user request for access by a user to an online game;
in response to receiving the user request from the user for access to the online game, automatically create a guest platform account for the user who is an unregistered user, the guest platform account including a first identifier and lacking stated information;
facilitate access to the online game by the user that is the unregistered user, wherein the unregistered user is associated with the guest platform account on an online gaming platform through which the online game is accessed, wherein the online gaming platform provides users access to multiple online games by multiple game providers via multiple client devices via the Internet, and wherein access to the online game is provided to the unregistered user using the first identifier of the guest platform account while the user remains unregistered;
after facilitating the access to the online game and while the user remains unregistered, receive an initial purchase request from the unregistered user for initiating a purchase of an in-game benefit associated with the online game; and
cause, responsive to the initial purchase request for the in-game benefit from the unregistered user associated with the online game, a platform registration request to be generated for the unregistered user that obtains the stated information from the unregistered user for inclusion in a registered platform account such that the unregistered user is required to provide the stated information for inclusion in the registered platform account before the initial purchase associated with the online game is completed.

2. The system of claim 1, wherein the initial purchase associated with the online game is a purchase of platform-wide currency usable across a plurality of different games associated with the online gaming platform, and wherein the machine-readable instructions comprise computer program modules, the computer program modules comprising:
a game request module configured to receive user requests for access to games, and to determine whether users making the user requests are associated with registered platform accounts;
a guest account module configured to automatically create the guest platform account for the user responsive to reception of a user request from the user for access to the online game, wherein the guest platform account includes a first identifier and lacks any stated information from the user;
a game access module configured to provide access for users to games in response to received user requests for access to the games, wherein the game access module is configured such that (i) responsive to reception of the user request for access from the user, the game access module effectuates transmission of a first platform request to a game provider of the online game, the first platform request including the first identifier and effectuating provision of the first game to the user by the game provider, and (ii) responsive to reception of a user request for access to the online game from a registered user that is associated with a registered platform account, the game access module effectuates transmission of a second platform request to the game provider of the online game, the second platform request including a second identifier in the registered platform account and effectuating provision of the online game to the registered user by the game provider;
a platform purchase module configured to receive and process requests by users for initiating purchases of platform-wide currency, and configured to determine when an unregistered user initiates a purchase of platform-wide currency; and a platform account registration module configured to generate a platform registration request for the user in response to a determination that the user has initiated a purchase of platform-wide currency.

3. The system of claim 2, wherein the one or more processors are further configured by machine-readable instructions to receive the stated information from the user in response to generating the registration request and to include the received stated information to transform the guest platform account into a registered platform account associated with the user, wherein the registration request is presented to the user in a graphical user interface.

4. The system of claim 3, wherein the registered platform account associated with the user retains the first identifier, and wherein the one or more processors are further configured by machine-readable instructions to, responsive to reception of a second request for access to the online game from the user, effectuate transmission of a third platform request to the game provider of the online game, the third platform request including the first identifier in the registered platform account associated with the user, and effectuate provision of the online game to the user by the game provider.

5. The system of claim 1, wherein the stated information comprises at least one of an email address and a password.

6. The system of claim 1, wherein the in-game benefit is usable only within the online game, and wherein the one or more processors are configured by machine-readable instructions to:

receive platform requests to provide access for users to the game, the platform requests including a first platform request to provide access for the unregistered user to the online game, the first platform request indicating that the unregistered user is not registered to a platform account;

execute an instance of the game and to use the instance of the game to provide access to the online game for the unregistered user in response to the first platform request, and to implement in-game actions in the instance of the online game in response to action requests for the in-game actions by the unregistered user;

obtain action requests input by users, wherein the action requests specify execution of the in-game actions by the user;

receive and process requests by users for initiating purchases of in-game benefits, and configured to determine when an unregistered user initiates a purchase of in-game benefits; and transmit instructions to an online gaming platform in response to a determination that the unregistered user has initiated a purchase of in-game benefits, the instructions effectuating presentation of a platform registration request to the unregistered user by the online gaming platform.

7. The system of claim 6, wherein the platform requests include associated identifiers, and wherein the one or more processors are further configured by machine-readable instructions to create a game account for the user associated with the first platform request's associated identifier.

8. The system of claim 6, wherein the in-game benefits are one or more of in-game currency, in-game items, in-game tips or in-game cheats.

9. The system of claim 1, wherein the purchases associated with the online game comprise in-game purchases usable only within the online game and platform-wide currency usable across a plurality of different games associated with the online gaming platform, wherein the initial purchase associated with the online game is an in-game purchase, wherein the machine-readable instructions further cause the one or more physical processors to facilitate access to an online game by a second unregistered user, wherein the second unregistered user is associated with a second guest platform account on the online gaming platform through which the online game is accessed and responsive to an initial purchase request from the second user for initiating an initial purchase associated with the online game, to cause a platform registration request to be generated for the second user that obtains stated information from the second user for inclusion in a second registered platform account such that the second user is required to provide the stated information from the second user for inclusion in the second registered platform account before the second user's initial purchase associated with the online game is completed, wherein the second user's initial purchase is a platform-wide currency.

10. The system of claim 9, wherein the in-game purchase obtains for the user one or more of in-game currency, in-game items, in-game tips and in-game cheats.

11. A computer-implemented method for in-game, payment-triggered game platform registration, the method being implemented in a computer system that includes one or more physical processors and storage media storing machine-readable instructions, the method comprising:

receiving a user request for access by a user to an online game;

in response to receiving the user request from the user for access to the online game, automatically creating a guest platform account for the user who is an unregistered user, the guest platform account including a first identifier and lacking stated information;

facilitating access to the online game by the user that is the unregistered user, wherein the unregistered user is associated with the guest platform account on an online gaming platform through which the online game is accessed, wherein the online gaming platform provides users access to multiple online games by multiple game providers via multiple client devices via the Internet, and wherein access to the online game is provided to the unregistered user using the first identifier the guest platform account while the unregistered user remains unregistered;

after facilitating the access to the online game and while the user remains unregistered, receiving an initial purchase request from the unregistered user for initiating a purchase of an in-game benefit associated with the online game; and causing, responsive to the initial purchase request for the in-game benefit from the unregistered user associated with the online game, a platform registration request to be generated for the unregistered user that obtains the stated information from the unregistered user for inclusion in a registered platform account such that the unregistered user is required to provide the stated information for inclusion in the registered platform account before the initial purchase associated with the online game is completed.

12. The method of claim 11, wherein the initial purchase associated with the online game is a purchase of platform-wide currency usable across a plurality of different games associated with the online gaming platform, and wherein the machine-readable instructions comprise computer program modules, the method further comprising:

receiving user requests for access to games;
determining whether users making the user requests are associated with registered platform accounts;
creating the guest platform account for the user responsive to reception of a user request from the user for access to the online game, wherein the guest platform account includes a first identifier and lacks any stated information from the user;
effectuating transmission of a first platform request to a game provider of the online game, responsive to reception of the user request for access from the user, the first platform request including the first identifier and effectuating provision of the first game to the user by the game provider;
receiving a user request for access to the online game from a registered user that is associated with a registered platform account;
effectuating transmission of a second platform request to the game provider of the online game, the second platform request including a second identifier in the registered platform account and effectuating provision of the online game to the registered user by the game provider;
receiving and processing requests by users for initiating purchases of platform-wide currency, and determining when an unregistered user initiates a purchase of platform-wide currency; and
generating a platform registration request for the user in response to a determination that the user has initiated a purchase of platform-wide currency.

13. The method of claim 11, further comprising receiving the stated information from the user in response to generating the registration request and including the stated information received to transform the guest platform account into a registered platform account associated with the user, wherein the registration request is presented to the user in a graphical user interface.

14. The method of claim 13, wherein the registered platform account associated with the user retains the first identifier, further comprising, responsive to reception of a second request for access to the online game from the user, effectuating transmission of a third platform request to the game provider of the online game, the third platform request including the first identifier in the registered platform account associated with the user, and effectuating provision of the online game to the user by the game provider.

15. The method of claim 11, wherein the stated information comprises at least one of an email address or a password.

16. The method of claim 11, wherein the in-game benefit is usable only within the online game, further comprising:
receiving platform requests to provide access for users to the game, the platform requests including a first platform request to provide access for the unregistered user to the online game, the first platform request indicating that the unregistered user is not registered to a platform account;
executing an instance of the game and using the instance of the game to provide access to the online game for the unregistered user in response to the first platform request;
implementing in-game actions in the instance of the online game in response to action requests for the in-game actions by the unregistered user;
obtaining action requests input by users, wherein the action requests specify execution of the in-game actions by the user;
receiving and processing requests by users for initiating purchases of in-game currency, and determining when an unregistered user initiates a purchase of in-game currency; and
transmitting instructions to the online gaming platform in response to a determination that the unregistered user has initiated a purchase of in-game currency, the instructions effectuating presentation of a platform registration request to the unregistered user by the online gaming platform.

17. The method of claim 16, wherein the platform requests include associated identifiers, further comprising creating a game account for the user associated with the first platform request's associated identifier.

18. The method of claim 16, wherein the in-game benefit includes one or more of in-game currency, in-game items, in-game tips or in-game cheats.

19. The method of claim 11, wherein the purchases associated with the online game comprise in-game purchases usable only within the online game and platform-wide currency usable across a plurality of different games associated with the online gaming platform, wherein the initial purchase associated with the online game is an in-game purchase, further comprising facilitating access to an online game by a second unregistered user, wherein the second unregistered user is associated with a second guest platform account on the online gaming platform through which the online game is accessed and responsive to an initial purchase request from the second user for initiating an initial purchase associated with the online game, causing a platform registration request to be generated for the second user that obtains stated information from the second user for inclusion in a second registered platform account such that the second user is required to provide the stated information from the second user for inclusion in the second registered platform account before the second user's initial purchase associated with the online game is completed, wherein the second user's initial purchase is a platform-wide currency.

20. The system of claim 19, wherein the in-game purchase obtains for the user one or more of in-game currency, in-game items, in-game tips and in-game cheats.

* * * * *

UNITED STATES PATENT AND TRADEMARK OFFICE
CERTIFICATE OF CORRECTION

PATENT NO. : 10,289,988 B1
APPLICATION NO. : 14/101215
DATED : May 14, 2019
INVENTOR(S) : Ziqiang Xu Page 1 of 1

It is certified that error appears in the above-identified patent and that said Letters Patent is hereby corrected as shown below:

In the Claims

Column 20, Line 53, Claim 20, change "system of claim 19" to --method of claim 19--.

Signed and Sealed this
Third Day of September, 2019

Andrei Iancu
*Director of the United States Patent and Trademark Office*